Figure 2:
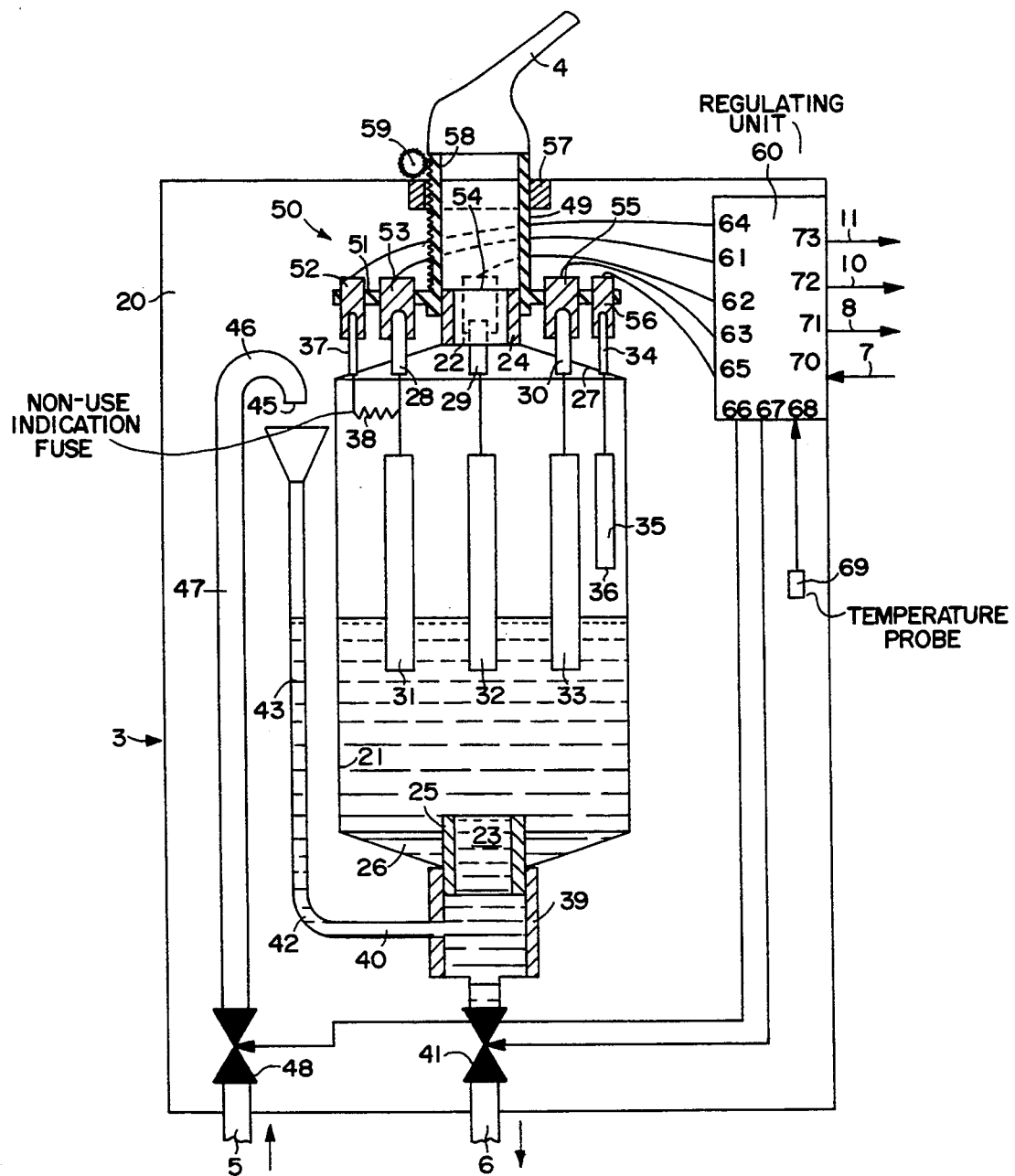

United States Patent [19]
Alix et al.

[11] Patent Number: 5,359,692
[45] Date of Patent: Oct. 25, 1994

[54] ELECTRONIC-TYPE VAPORIZER FOR AIRCRAFT HUMIDIFICATION HAVING A SINGLE USE DISPOSABLE STEAM GENERATION CONTAINER

[75] Inventors: Guy-Paul Alix; Marc Kohler, both of Brest, France

[73] Assignee: Industrielle du Ponant SA, France

[21] Appl. No.: 686,700

[22] Filed: Apr. 17, 1991

[30] Foreign Application Priority Data

Apr. 18, 1990 [FR] France ................... 90 05099

[51] Int. Cl.$^5$ ............... H05B 1/02; F22B 1/30; F24F 6/02
[52] U.S. Cl. ................... 392/327; 219/517; 392/401
[58] Field of Search ............... 392/324–327, 392/400, 401; 261/142; 219/517

[56] References Cited

U.S. PATENT DOCUMENTS

| | | |
|---|---|---|
| 3,219,796 | 11/1965 | Graf et al. ................... 392/327 |
| 3,937,920 | 2/1976 | Gundacker et al. ................... 392/327 |
| 4,146,775 | 3/1979 | Kirchner et al. ................... 392/327 |
| 4,262,191 | 4/1981 | Lepper et al. ................... 392/327 X |
| 4,347,430 | 8/1982 | Howard-Leicester et al. .... 392/327 X |
| 4,792,660 | 12/1988 | Cooley et al. ................... 392/327 |
| 4,841,122 | 6/1989 | Marton ................... 392/327 |

FOREIGN PATENT DOCUMENTS 122148 5/1971 Norway ................... 392/324
672015 10/1989 Switzerland ................... 392/324

Primary Examiner—Anthony Bartis
Attorney, Agent, or Firm—Laff, Whitesel, Conte, Saret

[57] ABSTRACT

The invention relates to a steam generator for humidifying an airplane air conditioning system. The steam is generated in a container (21). A support (50) enables a translational movement of a tubular part (49) connectable to a duct of a humidifier along the main axis of the container (21) in order to connect it with the outlet opening (24) of the container (21). Inside container (21), there are at least two electrodes (31, 32, 33) that are partially immersed in water and which are energized under a constant voltage up to a certain level of current in electrodes (31, 32, 33). Also, container (21) includes a fuse 38 with one end connected to a first of the terminals, the other end of the fuse being of the connected to one of the electrodes (31, 32, 33). A regulating unit (60) measures and maintains the intensity that current passing through electrodes (31, 32, 33). At the time of the installation of a new container, the regulating unit (60) determines whether the fuse (38) is or is not conductive. If the fuse is conductive, a current is sent through it to burn it out allowing the steam generator to be started. If not, the steam generator cannot be started until a new unused container having a conductive fuse is installed.

2 Claims, 3 Drawing Sheets

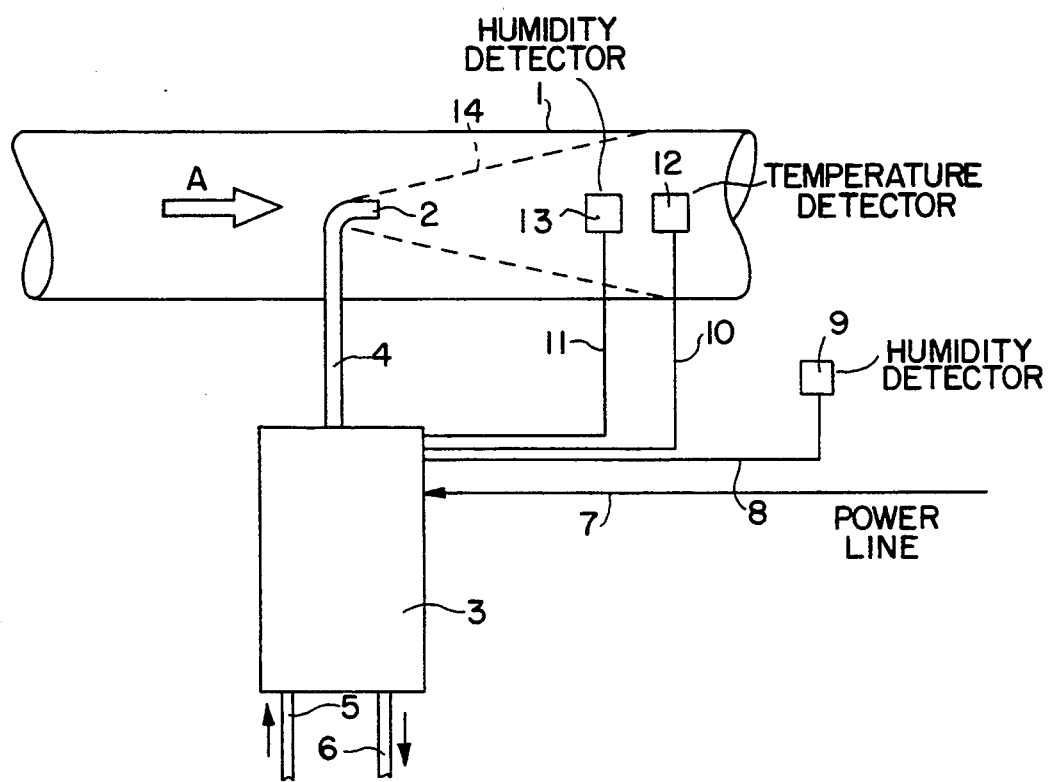
F I G. 1

ELECTRONIC-TYPE VAPORIZER FOR AIRCRAFT HUMIDIFICATION HAVING A SINGLE USE DISPOSABLE STEAM GENERATION CONTAINER

The present invention relates to a steam generator that is used in a humidifier for an air conditioning system, more especially for an air conditioning system in aircrafts.

Humidifiers for air conditioning systems in aircrafts are known, and for the sake of example, it will be possible to see (French) patent application No. 89 02063.

In that application, there is described a humidifier for an air conditioning system that comprises a airflow duct for the circulation of the hot air to be humidified, a steam generator the output opening of which is located at the summit of a diverging cone that extends as far as the internal wall of the duct, the lateral surface of the cone being equipped with perforations to permit passage of the hot air and to mix it, in a homogeneous manner, with the water vapor or steam developed by the steam generator.

The advantages offered by the use of a steam generator in a humidifier are well known and there will be mentioned, among the latter, the fact that it is possible to use water containing mineral elements and, more especially, the water from the airplane circuit. Let us also mention the fact that it functions without condensation appearing inside the airflow duct that leads the air to the airplane cabin.

One purpose of the present invention is to provide a steam generator that is usable in such a humidifier and in which the quantity of vapor that exits from it is perfectly regulatable, especially as a function of the need for humidity in the airplane.

To that end, a steam generator of a humidifier for an air conditioning system is connected by means of a duct to the dilution cone which is located inside an airflow duct for the circulation of the humidifier air. A container is equipped with an outlet opening for a steam generator therein. The opening is connected to the duct of the humidifier. An opening for filling the container with water is connected to the exit opening of a feed valve. The intake opening of the feed valve is connected to a source of the supply of water. Inside the container, at least two electrodes are partially immersed into the contained water, up to a certain level. The electrodes are fed current under constant voltage. A regulating unit measures the intensity of the current in the electrodes, and maintains the value of that current within a current range that surrounds a reference point. The regulating unit orders the opening of the water feed valve when the current passing through the electrodes has a value falls below the range, and that orders the closing of the water feed valve when the intensity of that current has increased to a value that is above said range.

The current-fed electrodes partially plunging in the water contained in the container, the electric current passes through the water and the quantity of heat it generates depends on the depth of the water in which the electrodes are immersed. The quantity of steam they generate and that comes out of the container is directly bound to the intensity of the current passing through them and, by causing variations in the quantity of water in the container, and therefore in the water level, there are caused variations in the current and therefore in the quantity of steam generated. The regulating unit therefore makes use of that fact to maintain the current within a current range and through that means, to maintain constant the level of humidity in the cockpit or in any other part of the airplane.

According to another characteristic of the invention, said reference point of the current is generated by the regulating unit on the basis of the difference between the value of the signal delivered by a hygrometer, and a reference value for the humidity level.

The quantity of steam developed, therefore, is perfectly regulated on the humidity level in the cockpit of the airplane, or in any other part of same, as a function of a preset point of reference.

According to another characteristic of the invention, the container further is equipped with a discharge opening connected to the intake opening of an electrically governed discharge valve, the governing input of said valve being connected to the regulating unit to perform, at times that are determined by the regulating unit itself, the discharge of a certain quantity of water contained in the container and the simultaneous cut-off of the current in the electrodes, that operation being immediately followed by an order for the opening of the feed valve, to bring the intensity of the current in the electric means back to inside the above range.

When the water evaporates, not only does the level inside the container go down, but the mineral element concentration increases. This has as its result, for a given intensity of the electrode current, to decrease the depth of the water into which the electrodes plunge. After a certain time of operation, that depth proves insufficient. By evacuating a certain quantity of water and filling with drinkable water available in the plane, the mineral element concentration is made to decrease, this causing the resistance of the water to increase until there is obtained a good operation. The electrode current is cut-off to prevent, during the discharge, leaks of current through the water downstream from the discharge valve.

According to another characteristic of the invention, the container is movably mounted on a support carries, in addition, the regulating unit and the feed and discharge valves, the regulating unit also governing on the one hand the feed valve to fill the container when the latter has just been installed on the support, or has just been put into operation and, on the other part, the discharge valve to empty the container each time the generator is stopped and at the time of its changing.

Thus, a humidifier equipped with a steam generator that offers that characteristic is especially healthy since no water, or at least little water stagnates in the container.

According to another characteristic of the invention, the discharge opening of the container is at a level that is above the bottom of said container.

When the container is emptied, there remains a reserve of water that, once mixed with the water introduced through the valve makes it possible, at the time the system is set into operation again, to have available a medium that contains enough minerals, that is to say a medium that is electrically conductive enough, for the generator to be capable of operating. When the generator is stopped, the emptying of the container is ordered, but there remains some mineralized water in that reserve, this making a later re-start of the operation possible.

According to another characteristic of the invention, the discharge opening and the feed opening of the container are at the bottom of the container, one and the same, and they are marked by a single duct that projects from each side of the container's bottom, the outlet opening of the feed valve being connected to said duct by means of an elbow-shaped duct to offer a linear part approximately parallel with the longitudinal axis of the container.

According to that embodiment of the present invention, it is the part of the duct that projects from the bottom and inside the container, that forms, with the bottom and the lateral walls of the container, the water reserve that makes possible the re-starting of the operation.

According to a characteristic of the invention, the regulating unit is constituted by a microprocessor type regulating unit.

Thus, the steam generator according to the invention has characteristics of operation that can easily be modified by means of a modification of the parameters of operation in the microprocessor programs.

According to another characteristic of the invention, the container comprises an electrode for the detection of the level, the lower edge of which is at a level higher than the normal maximum level of the water contained in the container and to which there is connected the regulating unit that, when it detects a current on that electrode, orders the cut-off of the current in the electrodes and the opening of the discharge valve to empty the container.

Thus, in case of poor functioning of the generator, in which the water level in the container is abnormally high, there is a detection of current in that electrode and the regulating unit orders it to stop.

According to another characteristic of the invention, the steam generator is equipped with a support movable in translation along the main axis of the container and that supports a tubular part connected to the duct of the humidifier and that comes to be hooked in a movable manner, on the steam outlet opening of the container, and with connecting blocks that receive connecting blocks power supply terminals of the container to which the electrodes of the container are connected.

Thus, by moving away from the container, the support disconnects the connecting blocks of the container and disconnects the opening of the container, it being then possible to remove the latter.

According to another characteristic of the invention, the container is equipped with an electrode connected to the regulating unit, and that is connected, inside the container, to a first terminal of a fuse the other terminal of which is connected to one of the main electrodes the regulating unit verifying, at the time a new container is installed, whether the fuse is electrically or not, the regulating unit in the first case sending into the fuse a current intense enough to cause it to melt and, in the second case, forbidding the start of the generator's operation.

Thus, it is impossible to install a container that has already been used.

According to another characteristic of the present invention, the regulating unit receives the signals from a temperature probe and from a humidity probe both mounted inside the air circulation duct of the humidifier and, when the latter signals exceed preset values, it orders the cut-off of the current to the electrodes and the opening of the discharge valve.

According to another characteristic of the invention, the regulating unit receives the signals from a temperature probe located close to the container and, when these signals exceed a pre-set value, it orders the cut-off of the current to the electrodes and the opening of the discharge valve.

These means constitute safety means that stop the generator when a bad functioning is detected.

Figure 3:
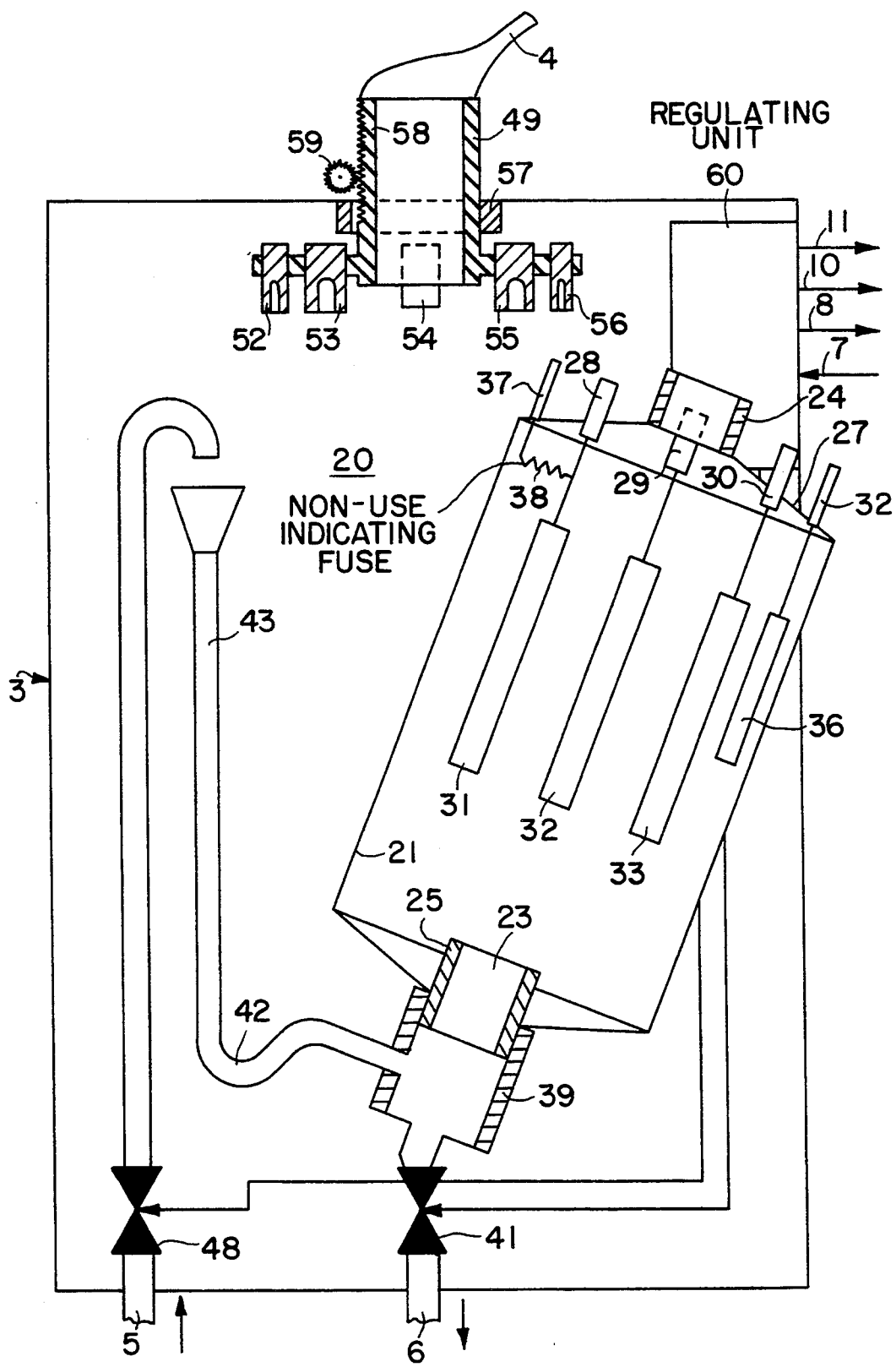

The above-mentioned characteristics of the invention, as well as others, will appear more clearly from the reading of the following description of an example of execution, said description being given with reference to the attached drawing in which:

FIG. 1 shows the diagram of principle of an air humidifier making use of a steam generator according to the invention, FIG. 2 is a section view of a steam generator according to the present invention, said generator being ready to operate, and FIG. 3 is a section view of a steam generator according to the present invention, the container of the generator being shown slanted and ready to be removed.

FIG. 1 shows an air circulation airflow duct 1 of an airplane, that air that has already been warmed, having to be humidified. In the cylindrical airflow duct 1, there is installed, in the axis of the airflow duct, the outlet opening 2 of a steam generator 3, the means for the fixation of the outlet opening 2 not being shown. The outlet opening 2 is connected to the steam generator 3 by means of a duct 4 that runs through the wall of airflow duct 1.

The steam generator 3 receives, through a duct 5, water from the source (not shown) in the airplane, while, through duct 6 it is connected to an overflow (not shown). It is connected, by means of a multiwire line 7, to a source of electric current (not shown). It is also connected, through a wire 8, to a humidity detector 9 mounted, for example, in the cockpit of the airplane, by means of the wires 10 and 11, respectively to a temperature detector 12 and to a humidity detector 13.

Around the outlet opening 2 there is mounted the small base of a cone 14 that has the same axis as the longitudinal axis of airflow duct 1, and the large base of which comes as a single piece with the internal surface of airflow duct 1, downstream from outlet opening 2. The lateral wall of cone 14 is pierced with holes through which there passes the warm air that thus enters cone 14 (arrow A), the regime of the airflow downstream from cone 14 being turbulent in order to ensure a homogeneous mixing of the air and of the steam sent by the output opening 2.

The steam generator 3 shown in detail in FIG. 2, comprises a support 20 on which there is mounted a container 21 essentially cylindrical in shape the two bases of which have the shape of a truncated cone.

At the high and low ends of container 21, the latter respectively has openings 22, 23, limited by axial ducts 24, 25. The end of duct 25 inside the container 21 is at a level higher than that of the bottom 26 of the container. Indeed, the lower duct 25 projects on each side of the bottom of container 21. On its upper wall 27, container 21 is equipped with three male electrical connection terminals 28, 29, 30 that are equidistant, to which there are respectively connected, inside container 21, three metallic electrodes 31, 32 and 33. The latter are parallel with the longitudinal axis of the container and they are immersed up to a certain depth in the water contained in that container. In FIG. 2, fine dash lines inside the container 21 represent the water found in container 21. A fourth connecting male connection terminal 34, also provided for on the upper wall 27, is connected to a fourth metallic electrode 35 parallel with the longitudinal axis of container 21 and the lower edge of which is at a level higher than the lower edges of the main electrodes 31, 32, 33. A fifth connecting male connection terminal 37 is provided on the upper wall 27 of container 21 and it is connected, inside that container, to a first terminal of a fuse 38, the other terminal of which is connected to the electrode 31.

The lower duct 25 is fitted on a first end of a duct 39 that laterally receives a duct 40, the other end of duct 39 being connected to the intake opening of a discharge valve 41 that is electrically driven. The outlet opening of valve 41 is connected to pipe 6 already shown in FIG. 1. It is shown mounted as a single piece with support 20. Duct 40 has an elbow 42 and a linear part 43 that is approximately parallel with the longitudinal axis of container 21. At the end of the linear part 43, there is provided a flared part 44 that faces the end 45 of a second duct comprising an elbow 46 and a part 47 for connection with the outlet opening of an electrically governed feed valve 48. Valve 48 has its intake opening connected to duct 5 already shown in FIG. 1. The free end 45 of the second duct 46, 47 advantageously is equipped with a small opening so that the water that escapes from it falls drop by drop into the flared part 43 of the first duct 40. That arrangement is provided in order electrically to insulate the water contained in container 21 from the electric mass of valve 48.

The upper duct 24 of container 21 is fitted on a tubular part 49 of a support 50. The latter is constituted by a plate 50 coming as one piece with the tubular part 49 and on which there are provided five female electrical connecting terminal 52 to 56 that respectively come to fit on electrical connecting terminal 37, on the three male electrical connecting terminal 28, 29, 30, and on the male terminal 34 of container 21. The tubular part 49 is provided axially slidable inside a socket 57 coming as one piece with support 20. On one of its generatrices, the tubular part 49 is equipped with a rack 58 that engages with a toothed wheel 59 the shaft of which is mounted rotatable on support 20. The tubular part 49 receives, in its upper part, duct 4 already shown in FIG. 1, and that connects the steam generator 3 to the humidifier.

On support 20 there is also mounted a regulating unit 60 that comprises three outputs respectively connected to the three female electrical connecting terminal 53, 54, 55 (themselves connected to the electrodes 31, 32, 33), an input/output 64 connected to electrical connecting terminal 52, an input 65 to which there is connected the fourth electrical connecting terminal 56, two outputs 66, 67 respectively connected to the inputs governing the valves 48, 41, an input 68 connected to a temperature probe 69 mounted on support 20, a multiwire input 70 that receives, through the multiwire line 7 already shown in FIG. 1, the feed voltages necessary for the good operation of the generator, and three inputs 71, 72, 73 respectively connected to the lines 8, 10, 11, already shown in FIG. 2. Let us recall that these lines 8, 10, 11 are respectively connected to a hygrometer 9 advantageously mounted in the cockpit of the airplane, to a temperature probe 12 and to a humidity probe 13, all of them mounted inside sheath 1.

When toothed wheel 59 is made to rotate, it upwardly drives the support 50, by means of rack 58. The female connecting terminals 52 to 56 become separated from the male connecting terminals 28, 29, 30, 34, 37 of container 21 and its tubular part 49 becomes disengaged from the upper duct 24 of container 21. As shown in FIG. 3, the tubular part 39 can pivot over a certain angle around an axis perpendicular to the plane of support 20 and it can drive along container 21 in that angular displacement. The latter can then be removed when its lower duct 25 is separated from the tubular part 39.

It will be noted that in FIG. 3 the connections of the connecting terminals 52 to 56, to the regulating unit 60 are not shown in order not to complicate the drawing.

The regulating unit 60 advantageously is piloted by a microprocessor, so that the operation of the steam generator according to the invention is bound to the governing programs of that microprocessor.

Thus, the regulating unit 60 receives the signals from the two temperature probes 12, 69, from a humidity probe 13 and from a hydrometer 9, and it governs, as a function of the signals received and of their treatment by the microprocessor, the electrodes 31, 32, 33 and the valves 41, 48.

The principle of operation is as follows: the three electrodes 31, 32, 33 are supplied a three phase AC voltage the value of which is approximately constant, and they are immersed, up to a certain depth, in the water contained in container 21. The latter is only partially filled with water. The value of the current that circulates through the electrodes 31, 32, 33 is proportional to the height of the water that wets them, and to the conductivity of the water inside the container. The latter increases with the concentration in mineral elements. The water in the container warms up as a result of Joule's effect, and the quantity of water that evaporates is directly proportional to the value of the current that circulates through electrodes 31, 32, 33. The water vapor generated is removed from the container by duct 4 and it reaches the small base of cone 14 inside sheath 1 to become mixed with the air circulating there and to humidify it.

In evaporating, the water level in container 21 goes down and the electrodes 31, 32, 33 are immersed in a more limited depth, this having as its result to lower the intensity of the current that passes between them. In fact, that decrease of the water level is accompanied by an increase of the water concentration in mineral elements. The lowering of the level however, is most important for the increase in (that) concentration. The electrodes 31, 32, 33 are then in the seat of a lesser quantity of steam.

The regulating unit 60 detects a lowering of the current intensity corresponding to a certain quantity with respect to the given reference current (a quantity of the order of 10% for example), it orders the opening of valve 48. The end 45 of duct 46, drop-by-drop, supplies water into duct 40, and, because of the principle of communicating vessels (the upper end of flaring part 44 being at a higher level than the level of the water in the container), this adds water into container 21. The water level in the latter rises and the intensity of the current passing through the electrodes increases in proportion. When the current has reached an intensity higher by a certain quantity (10% for example) relative to the reference current, the regulating unit orders the closing of valve 48. The intensity of the current that circulates through the electrodes 31, 32, 33 therefore remains within a current range that is centered on the current reference value. The quantity of vapor developed as well as, consequently, the humidity level in the cockpit, thus remain approximately constant taking into account the hysteresis effect introduced by the operation of the regulating unit 60.

The regulating unit thus performs cycles during which water is introduced into the container to compensate for the lowerings of current obtained during evaporation. At certain times, that may be either pre-set or, determined by the regulating unit as a function of the variation of the current passing through the electrodes, unit 60 orders the opening of valve 41 to evacuate a certain quantity of water that, it also, may be either pre-set or determined by the regulating unit itself as a function of the above-mentioned picture. The opening of valve 41 is performed simultaneously with the current cut-off on the electrodes, this in order to prevent current leaks through the water being discharged, downstream from valve 41. Once valve 41 is closed, the unit orders the opening of valve 48 for the introduction of water into the container. In that way, the increase in mineral element concentration during evaporation is compensated, not during all cycles, something that is not necessary, but at certain times.

In the regulating unit 60, the value of the signal supplied by hygrometer 9 is compared with a reference value for the humidity level, and the result of that comparison serves to establish within the regulating unit itself, the reference current for the electrodes. It is, as already seen, from that current reference value that the regulating unit 60 maintains the current between the electrodes within a certain current range. If the humidity level in the cockpit is lower than the humidity reference value, the regulating unit 60 increases the current reference value in proportion to the difference between these levels. Likewise, if the level is higher than the humidity reference level, the regulating unit 60 establishes an electrode current reference value that is decreased proportionally to that difference.

The temperature probes, one at proximity of the container, the other inside the air flow duct, may, according to a simplified mode of operation of the invention (an operation that is bound to the programs of the microprocessor in unit 60), play a safety role. If the temperature is too high, or if it varies too greatly, the current is cut-off in the electrodes.

If the water level in the container is too high, it might be a result of a poorly functioning of one of the valves. A current can then circulate through the high water between the electrodes. It is the regulating unit that detects that current and then orders the opening of the discharge valve and a stopping of the system's operation.

As already mentioned, the tubular part projects on each side of the container bottom. The part played by the part projecting inside the container, is the possibility of constituting a reserve of water loaded with mineral elements. Thus, when installing a new container, same may be filled with drinkable feed water from the airplane and the current can be sent into the three electrodes that can then start to work normally.

At the time of the installation of a new container, the regulating unit verifies the electrically conductive state of the fuse by sending a current, through the electrical connecting terminal for example. If the fuse is electrically conductive, the regulating unit sends into the fuse a current intense enough to melt the latter, then it initializes a clock and, after a period of time that is defined as the life period of the container, it starts an alarm (not shown). On the other hand, if the fuse is not electrically conductive, this means that there has been installed an already used container and the regulating unit signals this, for example by means of a light signal installed inside the cabin. That function has as its purpose to limit the clogging-up of the electrodes 31, 32, 33.

We claim:

1. A steam generator for humidifying an air conditioning system, means for connecting said generator through a duct (4) to a dilution cone inside an air circulation duct (1) of a humidifier, said generator comprising a container (21) having an outlet opening (22) for emitting steam that is generated inside said container (21), said opening (22) being connectable to the duct (4) of the humidifier, a filling opening (23) for filling the container with water, said fill opening (23) being connected to the output of a water feed valve (48), the intake opening of said valve being connectable to a source of water, at least two electrodes (31, 32, 22) inside said container (21) partially immersed in the water, said electrodes (31, 32, 33) being supplied with electrical current under constant voltage, and a regulating unit (60) that measures the intensity of the current passing through said water between electrodes (31, 32, 33), said regulating unit (60) including means responsive to the measured current intensity for maintaining the value of that current intensity within a current range that is centered on a reference value, means for opening the water feeding valve (48) in response to the intensity of the current passing through said electrodes (31, 32, 33) falling below the range and for closing the feed valve (48) in response to the intensity of the current rising above the range, the container (21) being mounted on a support (20) that carries the regulating unit (60) and said feed valve (48), a discharge valve (41), said discharge valve (41) being associated with a discharge opening on the container for controlling a discharge of water from the container, and means in the regulating unit (60) for operating the discharge valve (41) to empty container (21) each time the generator is stopped, wherein the discharge opening (23) of container (21) is located at a level inside container (21) that is above the bottom (26) of the container (21), said support (20) being provided with a support means (50) movable in translation along a main axis of the container (21), said support means supporting a tubular part (49) adapted to be connected to the duct (4) of the humidifier, means for selectively moving said support means toward and away from said outlet opening (24) of said container (21), and said support means having electrical connecting terminals (53, 54, 55) that receive the connecting terminals (28, 29, 30) on said container (21) electrically connected to said electrodes (31, 32, 33) in said container.

2. A steam generator for humidifying an air conditioning system, means for connecting said generator through a duct (4) to a dilution cone inside an air circulation duct (1) of a humidifier, said generator comprising a container (21) having an outlet opening (22) for emitting steam that is generated inside said container (21), said opening (22) being connectable to the duct (4) of the humidifier, a filling opening (23) for filling the container with water, said fill opening (23) being connected to the output of a water feed valve (48), the intake opening of said valve being connectable to a source of water, at least two electrodes (31, 32, 22) inside said container (21) partially immersed in the water, said electrodes (31, 32, 33) being supplied with electrical current under constant voltage, and a regulating unit (60) that measures the intensity of the current passing through said water between electrodes (31, 32, 33), said regulating unit (60) including means responsive to the measured current intensity for maintaining the value of that current intensity within a current range that is centered on a reference value, means for opening the water feeding valve (48) in response to the intensity of the current passing through said electrodes (31, 32, 33) falling below the range and for closing the feed valve (48) in response to the intensity of the current rising above the range, the container (21) being mounted on a support (20) that carries the regulating unit (60) and said feed valve (48), a discharge valve (41), said discharge valve (41) being associated with a discharge opening on the container for controlling a discharge of water from the container, and means in the regulating unit (60) for operating the discharge valve (41) to empty container (21) each time the generator is stopped, wherein the discharge opening (23) of container (21) is located at a level inside container (21) that is above the bottom (26) of the container (21), said container (21) being equipped with a connecting terminal (37) connected to the regulating unit (60), and connected, inside container (21) to a first terminal of a fuse (38), the other terminal of said fuse being connected to one of the electrodes (31, 32, 33), the regulating unit (60) having means for verifying, at the time of the installation of a new container, whether the fuse (38) is or is not conductive and if the fuse 38 is conductive the regulating unit (60) sends into the fuse (38) a current of sufficient intensity to cause it to melt and if the fuse 38 is burned out, forbidding the start of operation of the generator.

\* \* \* \* \*